United States Patent [19]

Walle

[11] 3,994,311
[45] Nov. 30, 1976

[54] PNEUMATIC AMPLIFIER
[75] Inventor: L. Irwin Walle, Clearwater, Fla.
[73] Assignee: Tangen Drives, Inc., Clearwater, Fla.
[22] Filed: June 2, 1975
[21] Appl. No.: 583,059

Related U.S. Application Data
[63] Continuation of Ser. No. 406,245, Oct. 15, 1973, abandoned.

[52] U.S. Cl. .................................... 137/84; 137/82
[51] Int. Cl.² ........................................ G05D 16/00
[58] Field of Search ........ 251/61.5; 137/82, 596.18, 137/84, 85

[56] References Cited
UNITED STATES PATENTS
| | | | |
|---|---|---|---|
| 2,446,051 | 7/1948 | Leslie | 251/61.5 X |
| 3,443,587 | 5/1969 | Brooks | 137/596.18 |
| 3,692,054 | 9/1972 | Buls | 137/596.18 |

Primary Examiner—Alan Cohan

[57] ABSTRACT

A pneumatic amplifier is disclosed having a body, the body with two opposed heads, a sensor head, and a valve head. An air direction chamber is defined interiorly of the two heads and body, and is separated from the sensing chamber by means of a sealed piston. The piston is actuated at one side by means of back pressure on a jet orifice which is connected to a sensor supply, and the back pressure is translated into a movement of the flexible piston. In the valve chamber, a dart valve is actuated on one end by the piston, and its cone at the other end seats in a valve seat in pneumatic connection with the valve head. The valve head has a signal supply which, when not by-passed through the dart and its associated valve, passes out through a signal tube to actuate a signal device, whether ultimately pneumatic, electric, hydraulic, or other source of power. Optionally a diaphragm type piston is employed. The dart is formed of plastic having three or more vanes, the same seating within an air direction chamber but in loose fit pneumatically suspendable relationship thereto. The valve body also optionally has a manifold which diverts the signal supply to the signal tube responsive to the operation of the dart.

9 Claims, 8 Drawing Figures

FIG. 6

PNEUMATIC AMPLIFIER

This is a continuation of application Ser. No. 406,245, filed Oct. 15, 1973, now abandoned.

BACKGROUND OF INVENTION

1. Field of Invention

The present invention relates to pneumatic amplifiers or pneumatic sensing devices which generally sense the back pressure from a jet for purposes of controlling the movement of a member, gauging size, or inspecting parts. This back pressure is amplified to a level whereby a signal is generated or such strength that it can actuate an electrical switch or pneumatic or hydraulic mechanism. The subject matter is generally found in Patent Office Class 137, Subclass 82, but is not necessarily entirely limited to this classification.

DESCRIPTION OF PRIOR ART

The prior art is exemplified by U.S. Pat. No. 3,105,508 which discloses a pneumatic relay. While this unit proports to be directed to the reduction of friction, it recognizes the problem of pneumatic centering of various parts, and is believed to be deficient in this respect when compared to the present invention. U.S. Pat. No. 3,050,034 discloses the utilization of tapered type gate valve in a pneumatic signal device. Older U.S. Pat. No. 2,641,689 illustrates the utilization of a diaphragm type barrier in signalling, and includes spring loading of the same. Unfortunately, however, it did not recognize the requirement for instantaneous reaction to back pressure in order to make a pneumatic amplifier work, particularly where close tolerances are involved. U.S. Pat. No. 3,536,087 discloses a shuttle valve for use in pneumatic type amplifiers, but further highlights the deficiency of the prior art by illustrating such a shuttle valve which has cylindrical frictional contact with its retainer, and accordingly is impeded by friction from supply the instantaneous or substantially instantaneous translation of back pressure sensing into signal generation.

SUMMARY

The present invention stems from the discovery that a dart shaped shuttle valve which is suspended and centered pneumatically within an air direction chamber can translate the flexing of a flexible piston responsive to changes in back pressure into actuation and seating and thereby divert a supply pressure into a signal operating pressure. More specifically, a lightweight dart having a plurality of vanes is permitted to shuttle pneumatically within an air direction chamber, one end of the dart having a cone which seats in a valve seat within the body and eliminates the diversion of supply pressure for the signal operator thereby actuating the signal. The dart, in turn, is actuated by a flexible piston which is sealed within the body defining a sensing chamber in opposed relationship to an air direction chamber. Back pressure sensed through a jet with sensing supply air within the sensing chamber actuates the dart valve. Optionally a coaxial spring is mounted about an air direction chamber and dart to yieldably urge the piston member into a non-signal generating circuit relationship to thereby avoid activation of the unit in the event of a gravitational dislocation of the amplifier at the time of actuation. In addition, a distributor seat is provided for direct contact with the piston and in pneumatic communication with the back pressure jet in order to supply, through by-passed channels, the back pressure necessary to activate the piston in a uniformly distributed fashion, and also, in the event of jamming of the piston against the sidewall of the sensor plate, to provide air by-pass means for relieving the jamming effect.

In view of the foregoing it is a principal object of the present invention to provide a pneumatic amplifier which utilizes the inherent action of the pneumatics to effect a friction reduced relationship between the valve actuator and its co-ordinated elements.

Still another object of the present invention is to provide a pneumatic amplifier in which the airflow is directed in such a fashion as to be self purging of dirt and other contaminates, because the use of vanes on the dart effects a substantial reduction in pressure drop.

A further objective of the present invention becomes apparent from the review of the small number of parts required to assemble the subject pneumatic amplifier. A related object of the invention is to provide a coordinated relationship of three basic parts which, when assembled, provide the body and interiorly house the actuating valve and piston completing the assembled unit.

Still another object of the present invention is to achieve the foregoing objectives with a unit which is inherently economical to manufacture and assemble, and accordingly promote the use of pneumatic amplifiers.

Yet another and more detailed object of the present invention is to provide a pneumatic amplifier with fine tuning adjustment features which maybe readily adjusted in a field installation.

A further objective of the present invention is to provide a pneumatic amplifier in which visual means for inspecting its fidelity of operation maybe employed, thereby reducing substantially the trouble shooting responsibility of maintenance personnel.

DESCRIPTION OF DRAWINGS

Further objects and advantages of the present invention will become apparent as the following description of an illustrative drawings take place, in which.

DESCRIPTION OF PREFERRED EMBODIMENT

Figure 1:
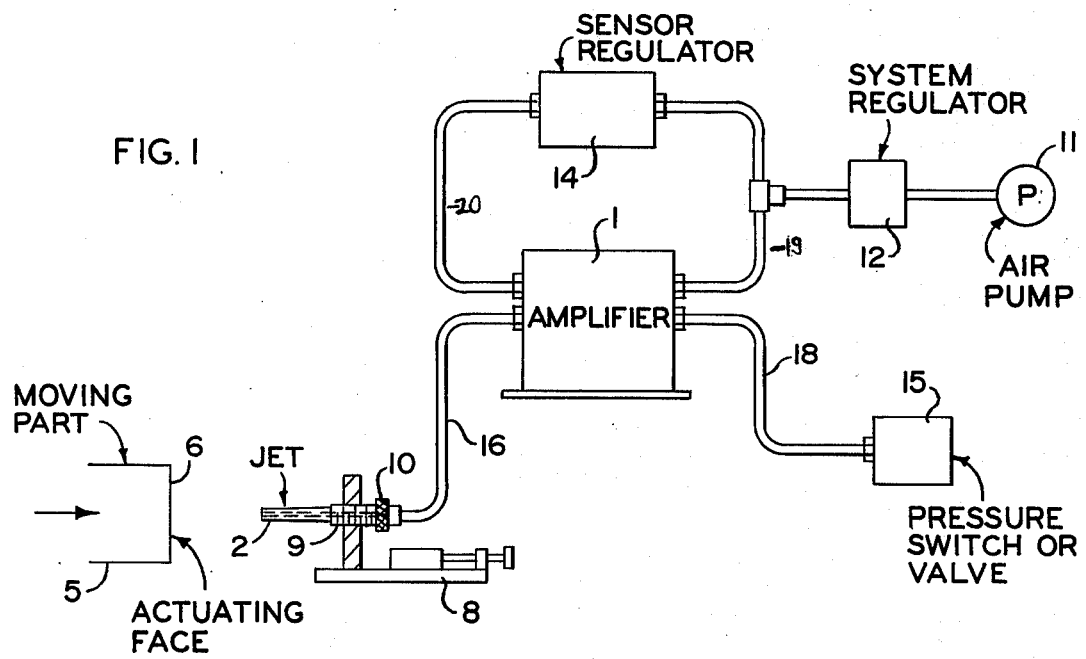
FIG. 1 is a schematic view of a typical pneumatic system employing an amplifier illustrative of the present invention.

Prior to describing in detail the structural and functional elements of the pneumatic amplifier illustrative of the present invention, a description will be made of a typical system in which such an amplifier may be commercially and usefully employed. Turning now to FIG. 1 of the drawings, it will be seen there that the amplifier 1 is positioned for capability of utilizing a jet 2 in order to determine the position of a moving part 5. The operation presupposes that the entire system is supplied by an air pump 11, delivering air to a typical factory circuit. A system regulator 12 is supplied in series with the air pump in order to regulate the pressure down stream therefrom at a given constant level. A T-joint is employed and thereby provides a sensor regulator in the supply line going to the sensor portion of the amplifier 1, at a reduced pressure. The sensor portion of the amplifier 1 delivers air through the jet tube 16 to the jet 2 which is provided with a threaded connection 9 to a mount 8, and its position can thereby be adjusted by rotating the same with the knurled knob adjuster 10. As the actuating face 6 of the moving part 5 approaches the jet 2, at a preselected position within very finite precise limits, a back pressure is sensed in the jet tube 16. This actuation moves a movable piston member interior of the amplifier 1 which, in turn, moves a valve which diverts air from the system through the signal side, and through the signal tube 18, to actuate a pressure switch or valve 15 in the usual manner of the prior art. Such a pressure switch or valve is really a power relay or converter, and typically includes electrical switches, pneumatic switches, hydraulic switches, gauging members, and indeed even air horns where the same are employed as a warning device. Many other circuits can be developed in which such pneumatic amplifiers are employed, and indeed, programmers with a plurality of cams actuating a plurality of such amplifiers maybe used for pneumatic logic type control of machine tools, and assembly machines. It is in this environment that the precision, accuracy, and simplicity of the invention is employed. Results in positioning a moving part to dimensions of plus or minus one ten thousands of an inch can be repeatedly achieved. Furthermore, fail-safe elements are employed in the amplifier to the end that failure to properly actuate the circuit, or to operate, will result in no signal pressure and accordingly reduce the possibility of an unexpected signal into the machine operator.

Figure 2:
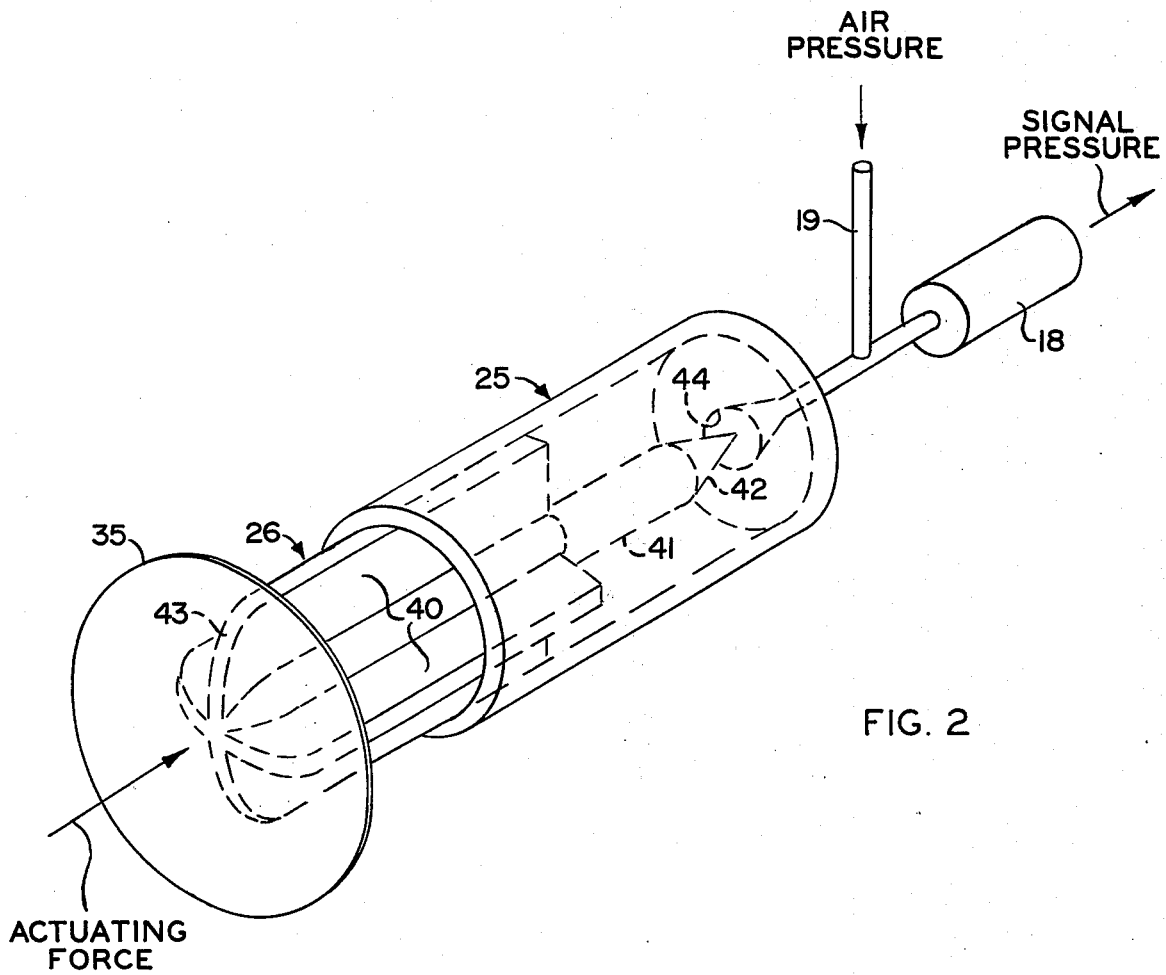
FIG. 2 is an enlarged, perspective, partially exploded diagramatic view illustrating the relationship between the dart. its valve seat, the signal air, and the piston.

The central portion of the illustrative pneumatic amplifier 1 includes a pneumatically floated dart 26 which is, in its environment, the actuator of the signal valve. As shown in FIG. 2, the dart 26 has a shaft 41 which terminates at its nose in a cone 42. The cone preferably has an included angle of sixty degrees. The dart also has a plurality of vanes 40 specifically designed to pneumatically float the dart 26. As shown, there are four vanes mutually perpendicular. It is contemplated, however, that two vanes or a plurality of vanes maybe employed commensurate with the size of the unit, an adequate pneumatic flow in order to assist in the self-centering action of the vein and thus frictional minimization of the travel of the vane interior of the air direction chamber 25. The vane is actuated either by air pressure which passes through the signal supply 19 and holds the dart cone 42 out of contct with the valve seat 44, or alternatively, when the piston plate radii 43 of the vanes 40 are actuated by the piston plate 35, the dart 26 is then moved forwardly from the position as shown in FIG. 2, and the cone 42 seats within the valve seat 44 thereby causing the signal pressure in the line 19 to increase in the signal tube 18 and actuate a pressure switch, power relay, or valve 15 as described in connection with FIG. 1 and the system there employed. It will be appreciated that a dimensional tolerance is provided between the vanes 40, and the air direction chamber 25. In a successful commercial embodiment a minimum of five thousands of an inch on each edge of the vane is provided for floating clearance away from the interior portion of the air direction chamber 25. Thus when the dart 26 is not being actuated by the piston plate 35, and air is passing over the cone 42, a pneumatic stabilization in centering takes place as the air rushes past the vanes. Alternatively, when the time comes that the dart 26 is actuated by the piston plate 35, the same is centered so that the cone 42 of the dart 26 is positioned to immediately and centeringly seat itself on the valve seat 44, thereby preventing the by-pass of the air pressure through the air direction chamber 25, and concentrating the same for delivery to the signal tube 18.

Figure 4:
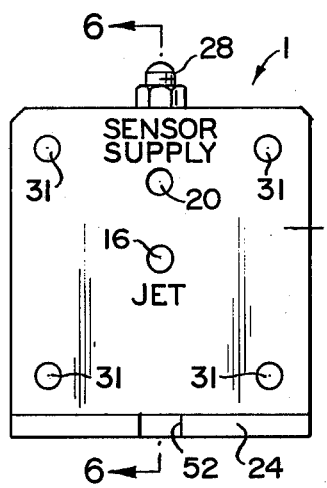
FIG. 4 is a view taken from the left end of FIG. 3 and enlarged in the same scale, illustrating the sensor head portion of the pneumatic amplifier.
Figure 3:
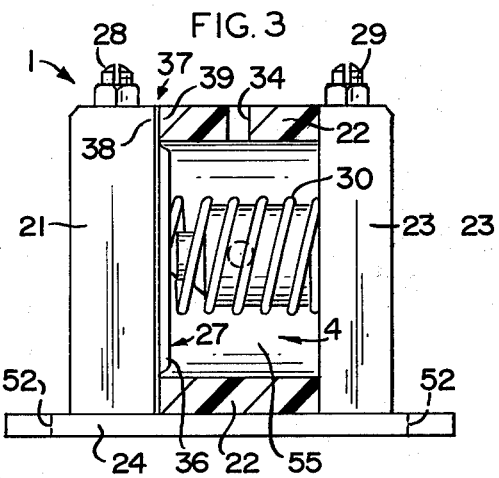
FIG. 3 is a front elevation of the pneumatic amplifier taken in partial section, and showing the window portion which permits visual inspection of the interior operaing elements of the pneumatic amplifier.
Figure 5:
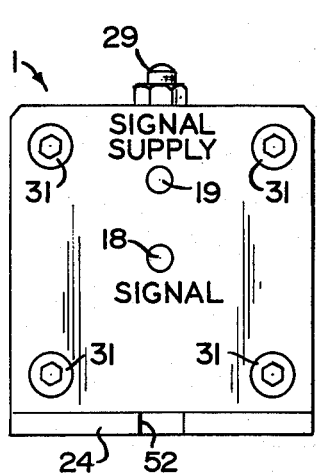
FIG. 5 is an end view taken from the right end portion of FIG. 3 illustrating in the same scale the valve head end of the pneumatic amplifier.

As will be seen in FIGS. 3, 4 and 5, the general configuration of the pneumatic amplifier 1 is that of a cube generally similar in shape to the prior art. The principal physical housing elements include a base plate 24, to which a hollow body 22 is attached thereatop. A sensor head 21 is secured to one side of the body, and a valve head 23 is secured to the other side of the body thereby enclosing the same to provide for a sensing chamber 3, and a valve chamber 4, the later being designated in FIG. 6. The valve chamber 4 and the sensing chamber 3 are separated by means of the piston 27. The piston seal 36, in turn, being a flexible member is secured in pneumatic sealed relationship to the body 22 by means of the piston seal clamp 37 which comprises the sensor head jaws 38 ane the body jaws 39. The piston seal clamp is actuated primarily by means of the tie bolts 31 which pass, as shown contrastingly in FIGS. 4 and 5, through the entirety of the body 22 and thereby clampingly engage the sensor head 21 and valve head 23 against the body 22 to provide for the clamping action of the piston seal 36. As noted, the piston seal 36 not only provides for a pneumatic sealed relationship between the sensing chamber 3 and the valve chamber 4, but also permits the piston plate 35 to flex depending upon changes in pneumatic pressure and more particularly the pressure differential between the sensing chamber 3 and the valve chamber 4.

Figure 6:
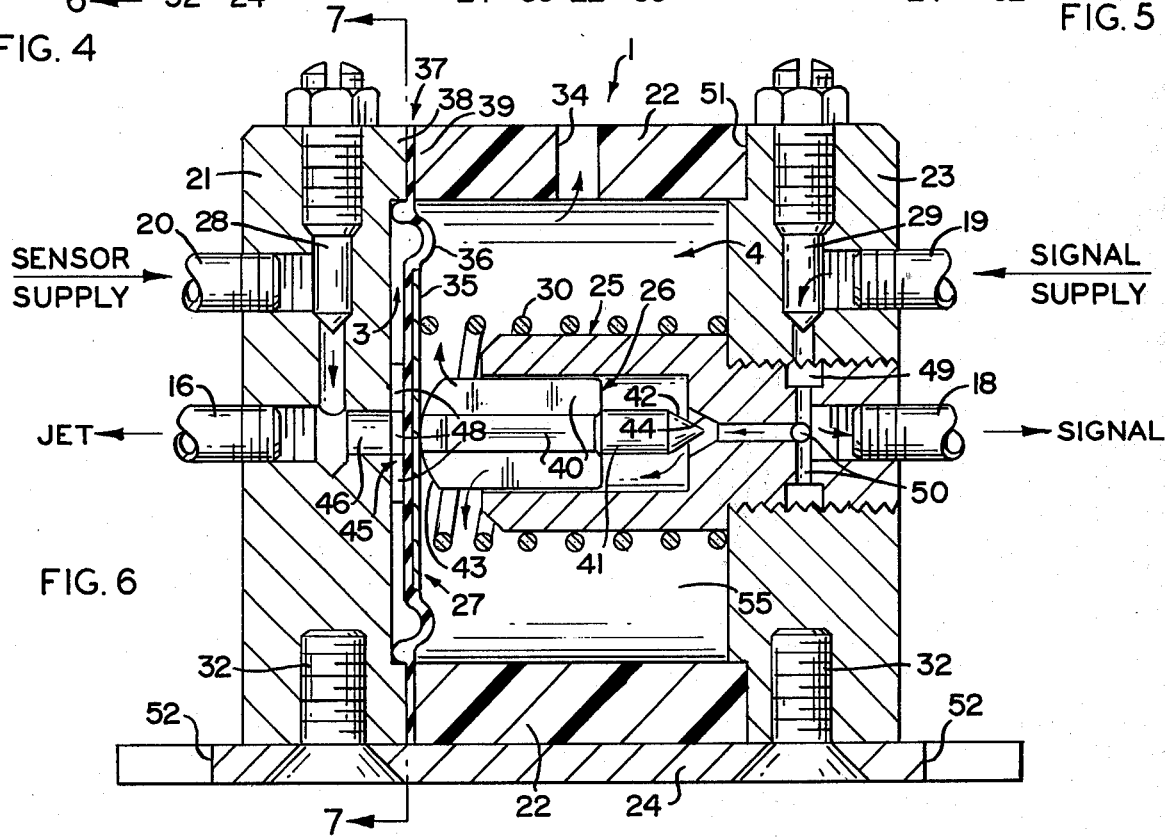
FIG. 6 is an enlarged sectional view of the pneumatic amplifier taken along section line 6—6 of FIG. 4.

The jet tube 16 is supplied by a sensor supply tube 20, as shown in FIG. 6. A needle valve 28 is provided in series communication between the sensor supply 20, and the jet 16 in order to precisely regulate the air passing ultimately through the jet 2 (illustrated in the system in FIG. 1). In operation, the valve cone 42, as shown in FIG. 6, is normally unseated and pneumatic flow is provided through the valve seat 44, around the vanes 40, and into the valve chamber 4. The air is evacuated through the vent 34 to atmosphere, thus maintaining the air pressure interiorly of the valve chamber 4 at approximately atmosphere or slightly thereabove. This action serves not only to provide a standard for a change in back pressure in the sensor chamber 3 which in turn will actuate the piston plate 35, but also provides a scouring and purging action to divert oil, dirt, and other contaminates which may find themselves in the valve chamber 4 out through the atmospheric vent 34 and away from the moving parts and delicate portions of the pneumatic amplifier 1. The air is supplied through the signal supply 19 and controlled by means of the relay needle valve 29, and passes through a circular manifold 49, and then a plurality of manifold ports 50.

Figure 7:
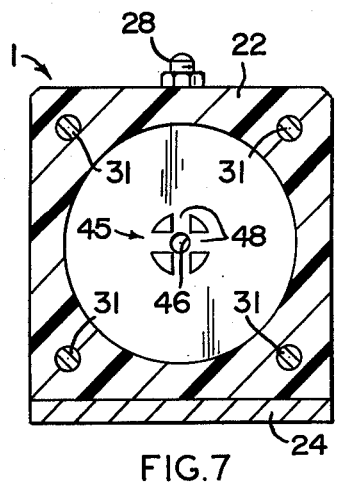
FIG. 7 is a transverse sectional view of the inner end portion of the sensor plate, illustrating the distributor seat and back pressure jet orifices, taken generally along section line 7—7 of FIG. 6.

As shown in most of the figures, a safety spring 30 is mounted in coaxial relationship with the exterior portion of the air direction chamber 25, and bears against the piston plate 35. Its principal function is to maintain the piston 27 away from contact with the dart valve 26. As the dart requires a minimum pressure to shift, the possibility of generating a signal to the power relay 15 without a positive pressure in the sensing chamber 3 is minimized if not eliminated. When the air pump 11 is actuated by the operator, and air supplied to the signal supply 19, inadvertent actuation of a signal by a pressure increase in the signal tube 18 is virtually impossible, and thus jamming at the start up of an operation is avoided. Another safety feature and, in addition, a feature which promotes good operation, is provided by the distributor seat 45 which is at the interface of the sensor head 21, and has a plurality of back pressure by-pass channels (see particularly FIG. 7) designated as reference numeral 48. Thus, if the piston 27, and more particularly its flexible sealing member portion 36 is driven hard against the distributor seat 45, when back pressure is sensed through the back pressure jet orifice 46, the same will be distributed through the by-pass channels 48 and into the sensing chamber 3 and, therefore, be effective over the entire piston area. This drives the piston 27 and more particularly the piston plate 35 against the dart valve radius 43 and actuates the valve. The piston 27, while shown as a conventional diaphragm and plate, may take a wide variety of configurations depending upon whether the amplifier is cubical, circular, and the sensitivity and service required. The diaphragm shown is commercially available at a very modest price, and is very durable in operation and quite sensitive in use. Accordingly, the paticular structure of the pneumatic amplifier 1 shown has been designed in order to accommodate the particular piston 27 just described. Also to be noted is the offset safety notch 51 in which the body 22 is joined to the jet plate 23 in such a fashion that an assembly operator is inhibited from positioning the piston 27 and its seal 36 at the wrong side of the body 22. Otherwise the offset safety 51 has no major functional significance. To be remarked, also, is that base plate mounting screws 32 may be extended, and thereby the base plate 24 may be secured against the frame, or other portion of a machine. Alternatively, the base plate 24 may be provided with mounting holes or notches 52 as shown, which can also be utilized to secure the base plate to another machine.

Figure 8:
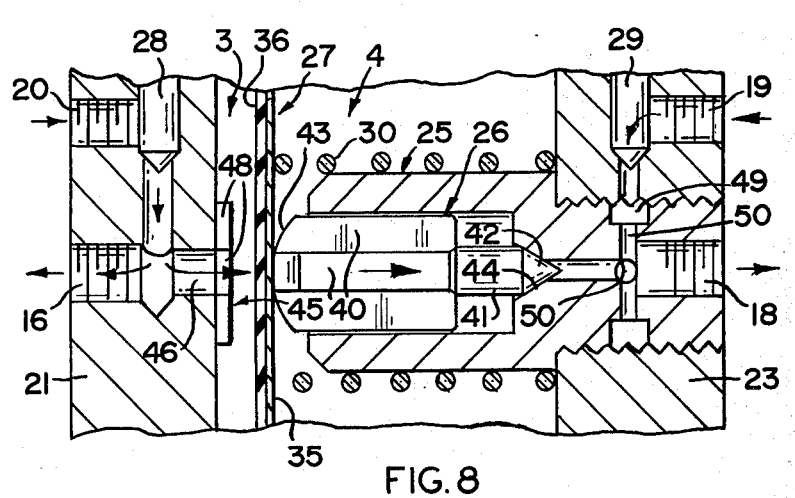
FIG. 8 is a view of the central portion of FIG. 6 illustrating the dart in the actuated or signal generating configuration.

FIG. 8 is a view of the dart 26, and generally shows the same in the seated configuration in which the dart cone 42 is seated in the valve seat 44. Preferably the included angle of the dart cone 42 is 60°, and the included angle of seat is also 60°. As will be seen, back pressure has been sensed and is distributed in four directions by the distributor seat 45 diverting the air through the four by-pass channels 48 and into the sensing chamber 3. This has caused movement of the piston 27, since the pressure in the sensing chamber 3 is greater than the pressure in the atmosphericly vented valve chamber 4, and the action compresses the safety spring 30 and impinges upon the piston plate radius 43 to drive the dart 26 into seating engagement. Upon this action, air which previously was diverted around the cone 42 of the dart 26 and into the valve chamber 4 and thence through the atmospheric vent 34, is no longer diverted, and thereafter the incoming air through the signal supply 19 is passed into the circular manifold 49 and through the manifold ports 50 to the signal tube 18 to actuate the power relay in the system as in the prior art.

It will be appreciated that the construction just shown and described is generally square, cubical, or circular, accordingly the machining steps in order to make the unit are minimized, and its cost is held to a minimum. Furthermore, the piston 27 is selected from a commercially available unit, thus rendering the dart 26 and the air direction chamber 25 the principal specially configured elements of the unit. Furthermore, as shown in FIG. 3, an observation window 55 may be provided on one side of the unit so that the interior can be observed, and more particularly the action of the piston 27 as well as the safety spring 30 be monitored. Thus, when employed in pneumatic logic, unlike a transistor or electrically operated member, visual observation can determine the operability of the unit. Furthermore, it will be appreciated that by removing the base plate mounting screws 32, of which there are two shown, and the four plate tie bolts 31, the entire unit may be disassembled for replacement or repair of various of the elements. Each of the needle valves 28, 29 are simple threaded members, and can be readily adjusted and thereafter locked to the adjusted pressure.

While the dart 26 has been shown and described with four vanes 40, it will be appreciated that any number of vanes which will center the shaft 41 and cone 42 or other seating member may be employed. The factors determining the number of vanes 40 are primarily, contamination and clogging, centering, and friction reduction. Thus the use of three vanes 40 on one hundred twenty degree spacing, or four vanes 40 as shown is preferred. When two vanes 40 are employed on one hundred eighty degree spacing, centering requires the use of a guide and the centering element or guides are subject to clogging by dirt in the air source.

Although particular embodiments of the invention have been shown and described in full here, there is no intention to thereby limit the inventon to the details of such embodiments. On the contrary, the intention is to cover all modifications, alternatives, embodiments, usages and equivalents of pneumatically centered dart valves used in pneumatic amplifiers as fall within the spirit and scope of the invention, specification and the appended claims.

What is claimed is:

1. In a pneumatic amplifier having a body, means for supply sensing air, means for supply operating air, a flexible piston member interiorly of the body dividing the same into a sensing chamber and a valve chamber, and having a valve closure and cooperating seat actuated by the flexing of the piston member responsive to the pressure differentials between the sensing chamber and the valve chamber, an improvement comprising
   a pneumatically floating and centered dart having a shaft, a plurality of vanes extending radially from the shaft, a valve closure at one end of the shaft, and piston engaging means at the end of the shaft opposite said closure, a tubular air direction chamber for the dart in loose fitting relationship with the vane portions of the dart having an inlet, restriction means to the inlet of the dart, output signal means in pneumatic communication with the inlet and the dart, a pneumatic sensing probe in pneumatic communication with the sensing chamber, and air means passing through the sensing chamber, said air means being controlled by a control valve determining the amount passing through the sensing chamber into the pneumatic probe, which, upon sensing a pressure differential in view of proximity to a stop block, will transmit the pressure differential to the diaphragm means and thereby operate the dart valve and the air control.

2. In the pneumaic amplifier of claim 1, said dart valve closure having a conical configuration, said valve seat having a complementary conical configuration, whereby conical face-to-face contact provides for the seating of the dart valve.

3. In the pneumatic amplifier of claim 1, a circular manifold in direct communication with operating air, a plurality of ports in said circular manifold diverting the operating air into the valve chamber when not actuated, said ports diverting said operating air into a signal tube when the dart is in seated relationship with the valve head.

4. In the pneumatic amplifier of claim 1, a safety spring in coaxial relationship with the dart, valve body, and bearing against one end of the body of the amplifier, and its other end bearing against the flexible piston, whereby the piston will be urged into the inoperative position to preclude premature operation or actuation of the power relay.

5. In the pneumatic amplifier of claim 1, a control valve controlling the amount of air flowing to the sensing chamber.

6. In the pneumatic amplifier of claim 1, a control valve controlling the operating air passing into the operating air conduit.

7. In the pneumatic amplifier of claim 1, a generally tubular body portion, a valve head closing one end of said body portion, a sensor head closing another portion of said body, the joint between the body and the sensor head providing clamping means for clamping a seal exterior and peripherally of the piston member.

8. In the pneumatic amplifier of claim 1, said body comprising a generally circular member, threaded means for securing the body into the body portion of the valve, and a circular manifold having a plurality of ports provided at a midposition on said threaded member to thereby deliver air to by-pass the dart valve and hold the same in the open position and, when the dart valve is closed, to provide air for delivery from the signal supply to the signal generating member.

9. In the pneumatic amplifier of claim 1, a circular manifold supply directing operating air through radial parts toward the valve seat, whereby a uniform flow distribution of air is directed around the vanes to reduce friction during actuation.

* * * * *